Patented Apr. 25, 1944

2,347,337

UNITED STATES PATENT OFFICE 2,347,337

SYNTHESIS OF TERPENE COMPOUNDS

Donald H. Sheffield, Wilmington, Del., assignor to Hercules Powder Company, Wilmington, Del., a corporation of Delaware No Drawing. Application May 28, 1941, Serial No. 395,613

9 Claims. (Cl. 260—611)

This invention relates to a method for preparing terpene ethers and more particularly it relates to a method for the preparation of ethers of polyhydric aliphatic alcohols derived from pinene or terpene fractions containing pinene.

Ethers which consist of a terpene radical and a radical of an aliphatic polyhydric alcohol bonded in ether linkage have been prepared by reacting pinene or turpentine with a polyhydric alcohol in the presence of an acid catalyst. Such ethers have found use in insecticides, in solvents for finishing compositions among other things, but their use has been limited because of an undesirable acrid odor apparently inherent in these products.

It is an object of the present invention to provide terpene-polyhydric alcohol ethers having little or no odor, at most, a mild, pleasant odor. It is a further object to provide a method which will give such a product. It is also an object to provide a method of preparing terpene-polyhydric alcohol ethers of improved efficiency over prior methods, i. e. a method in which the speed of reaction and the yield of valuable products derived from the raw material are increased. Other and further objects will appear hereinafter.

These objects are attained in accordance with this invention by reacting a pinene or a terpene fraction containing a pinene with an aliphatic polyhydric alcohol in a medium comprising a lower alkyl monohydric alcohol and an acidic etherification catalyst. This reaction produces ethers of terpene radicals and the radical of the polyhydric alcohol utilized, the terpene radical in predominance in these ethers being the terpinyl radical. At the same time, terpene ethers of the lower alkyl monohydric alcohol are also formed. The terpene ethers are recovered from the reaction mixture, and if desired, the polyhydric alcohol terpene ethers may be separated from the other terpene compounds present.

In this manner there are obtained terpene aliphatic polyhydric alcohol ethers of greatly reduced odor and substantially free of an acrid odor as compared with similar ethers prepared by previous processes. In some unknown manner, the presence of the lower alkyl alcohol appears to prevent the formation of by-products imparting the undesirable acrid odor heretofore associated with the polyhydric alcohol ethers of the terpenes. The method provides rapid and efficient reaction of the raw materials and provides as a valuable, readily marketable by-product lower alkyl ethers of terpenes. A higher total yield of useful product is obtained from a given quantity of terpene reacted upon.

The method in accordance with this invention may utilize as its raw materials either alpha-pinene or beta-pinene, or a terpene cut containing appreciable portions of either of these pinenes. Thus, ordinary gum terpentine or ordinary wood terpentine of the American variety, French variety, etc., may be utilized. Preferably, for greater efficiency and economy, a wood turpentine having as high as possible a content of alpha-pinene is utilized.

A number of aliphatic polyhydric alcohols may be used in the method according to this invention. For example, ethylene glycol, propylene glycol, trimethylene glycol, glycerol, erythritol, diethylene glycol, triethylene glycol, and the like are suitable.

The lower alkyl monohydric alcohol utilized may be, for example, methanol, ethanol, propanol, isopropanol, and the like. The proportion of the lower alkyl monohydric alcohol to the polyhydric alcohol may vary between fairly wide limits, the proportions being governed to some extent by the ratio of polyhydric alcohol ethers to monohydric alcohol ethers which it is desired to establish in the product. The ratio of ether derivatives obtained will vary as the ratio of the two types of alcohols is changed, the monohydric alcohols being slightly more reactive, and therefore contributing slightly more to the product than the polyhydric alcohols. For example, where the ratio of methanol to ethylene glycol is 1:1 on a molar basis, there will be formed about 3 mols of terpene methyl ethers to about 2 mols of terpene glycol ethers. However, the ratio of monohydric alcohol to polyhydric alcohol will be between about 1:4 and about 4:1, and preferably will be between about 2:1 and about 1:2.

The ratio of total alcohols to the pinene utilized may vary widely, but in general most convenient operation calls for a ratio between about 0.75:1 and about 4:1 of combined alcohols to pinene on a molar basis. Preferably, a molar excess of the alcohols is utilized.

The catalyst utilized to bring about etherification by addition of the aliphatic alcohols to the terpene utilized will be, such as, for example, sulphuric acid, phosphoric acid, nitric acid, benzene sulphonic acid, xylene sulphonic acid, toluene sulphonic acid, ethyl sulphuric acid, methyl sulphuric acid, ethyl sulphonic acid, and the like. Preferably, the acid will be in a concentrated form, the usual commercial so-called concentrated acids being suitable. The quantity of catalyst may vary widely, the speed of the reaction being to some extent proportional to the quantity of catalyst present. The quantity of catalyst may be between about 0.5% and about 50%, preferably between about 5% and about 15% of the total quantity of alcohols present at the beginning of the reaction.

The reaction is carried out at a temperature between about 30 and about 70° C. Preferably, the temperature is controlled to hold it between about 40 and about 50° C. The reaction is exothermic, and hence it is usually desirable to provide cooling means to maintain the temperature within the desired range.

The reaction is most conveniently carried out by mixing the pinene or terpene cut utilized with the polyhydric aliphatic alcohol and the lower alkyl monohydric alcohol and the catalyst. Effective and steady agitation is desirable to speed the reaction and to aid in the maintenance of uniform temperature conditions. An inert diluent such as acetone, methyl-ethyl ketone, etc., may be utilized, if desired. Reaction is continued until substantially no more ether formation occurs. A convenient method of determining this point comprises taking samples and determining the specific gravity of the oily component of the reaction mixture. When the specific gravity of this oily component no longer rises, substantial completeness of reaction has been obtained. The reaction time will, in general, vary from about 1.5 to about 16 hours.

Upon substantial completion of the reaction, the mixture is permitted to settle into two layers and the alcohol layer which will contain the greater proportion of the acid catalyst is removed. The oily layer which contains the desired product is then freed of residual acid. This is best accomplished by treating it with an aqueous alkaline solution, such as a water solution of sodium hydroxide, potassium hydroxide, potassium carbonate, sodium carbonate, or the like. The product is desirably given a final water wash to remove alkali and salts which may be present.

At this point, the reaction mixture consists of unreacted terpene hydrocarbons, monocyclic hydrocarbon conversion products, terpene-lower alkyl monohydric alcohol ethers, terpene-aliphatic alcohol ethers, and a small quantity of high boiling polymerized material. It will also contain a small quantity of unreacted monohydric alcohol not removed by the water washing. It is usually desirable at this point to separate the terpene ethers from the other components of the mixture. This is readily accomplished by distillation, preferably at reduced pressure. Any monohydric alcohol present will distill off first. Unreacted turpentine or pinene and monocyclic terpene hydrocarbon conversion products or impurities in the turpentine then follow. The next fraction contains the lower alkyl monohydric alcohol-terpene ethers. This is followed by the fraction containing the aliphatic polyhydric alcohol-terpene ethers. High boiling polymerized material of unknown composition remains as a still residue. In most cases the polyhydric alcohol ethers will be separated from the monohydric alcohol ethers for use. However, this is not essential.

The aliphatic polyhydric alcohol-terpene ethers produced will usually contain mostly mono-terpene ethers, but will contain some di- or tri-terpene ethers of the polyhydric alcohol utilized. An excess of alcohols insures the predominance of the mono-terpene ethers. The terpene ethers will comprise terpinyl ethers of the polyhydric alcohol utilized in major proportion, somewhat smaller fractions of other terpene ethers such as bornyl, isobornyl, and fenchyl ethers being formed. For example, when preparing ethylene glycol ethers from wood turpentine, the ethers produced by the procedures in accordance with this invention consist of two major fractions, the first boiling between 250° C. and 260° C. is composed largely of terpene ethers of the secondary alcohols, bornyl, and fenchyl alcohol. The second and predominant fraction boils between 260 and 274° C. and consists largely of tertiary alcohol ethers from the isomeric terpineols. The first fraction of terpene ethers has a very mild, pleasant odor, and the second fraction of terpene ethers is to all intents and purposes without odor. A similar fractionation of glycol ethers produced by prior methods yields fractions which are of pronounced, undesirable odor.

The method in accordance with this invention is illustrated by the specific examples thereof which follow. All parts and percentages are by weight unless otherwise specified.

*Example 1*

To a mixture of 1500 grams of ethylene glycol and 400 grams of methanol, there is added 100 grams of 95% sulphuric acid. After thoroughly mixing, 200 grams of wood turpentine is added and the resulting system is thoroughly agitated and maintained in the range of 40–45° C. by placing the reaction vessel in a cooling medium to remove heat of reaction. Agitation is continued until the specific gravity of the oily component of the mixture no longer rises. This requires about 7 hours. Agitation is then discontinued and the reaction mixture is permitted to separate into two layers. The lower layer of acidic glycol and methanol in excess of that consumed in the reaction is drained off and held for subsequent use in ensuing batches. The oily portion is then neutralized with aqueous caustic soda in preparation for fractionation. The neutralized material is then fractionally distilled. Small amounts of methanol and ethylene glycol are recovered and the following fractions then obtained:

1. Unreacted turpentine representing about 10–15% of the turpentine initially utilized.
2. Monocyclic terpene hydrocarbons representing about 25–30% of the turpentine utilized.
3. Terpene methyl ethers representing 20–25% of the turpentine utilized.
4. Terpene ethylene glycol ethers representing 45–50% of the turpentine utilized.
5. Still residue representing 5–10% of the turpentine utilized.

The terpene ethylene glycol ethers obtained in this example have the following analysis:

Specific gravity @ 15.5° C _____ 0.9799
Refractive index @ 20.0° C _____ 1.4797
Color _____ Water white
Boiling range:
    5% _____ °C __ 248.0
    20% _____ °C __ 259.0
    50% _____ °C __ 266.0
    70% _____ °C __ 268.0
    90% _____ °C __ 271.7
    95% _____ °C __ 275.5
Odor _____ Very slight, pleasant

*Example 2*

A mixture of 600 grams of isopropyl alcohol, 1200 grams of ethylene glycol and 250 grams of 95% sulfuric acid was maintained in a state of vigorous agitation. Beta pinene was slowly added to the mixture at a rate permitting the temperature to be held at 45–50° C. Two thousand grams of the beta-pinene were added over a period of 2½ hours in this manner. The reaction was continued for an additional four hours. It was found that the alcohol phase and the oily phase did not separate appreciably on standing, whereupon 1000 grams of water were mixed into the reaction mixture. This brought about separation into a water layer and an oily layer. The oily layer was removed from the water layer and washed with 1000 grams of water to remove excess acid. The oily layer was then washed with dilute caustic soda solution, for instance 5%, to remove residual acid. Excess isopropyl alcohol was removed by distillation, and the reaction product was then fractionated at an absolute pressure of 7–8 mm. to obtain a first fraction containing unreacted terpenes and isomerized terpenes, a second fraction consisting of terpene isopropyl ethers (mostly terpinyl ethers) a third fraction consisting of terpene ethylene glycol ethers (mostly terpinyl ethers), and a small still residue.

*Example 3*

A mixture consisting of 600 grams of methanol, 1200 grams of ethylene glycol, 300 grams of 85% phosphoric acid and 2000 grams of gum turpentine was agitated at a temperature maintained at 55–60° C. for 20 hours. After the oily layer ceased to change appreciably in specific gravity, the mixture was permitted to separate into two layers. The oily layer was neutralized with 25 grams of caustic soda and was fractionated at a pressure of 25 mm. A fraction consisting of terpene hydrocarbons, a fraction consisting of terpene methyl ethers, and a fraction consisting of terpene glycol ethers were obtained in this manner. The ether fractions were substantially odorless.

*Example 4*

A mixture consisting of 600 grams of ethyl alcohol, 1200 grams of ethylene glycol, 250 grams of 95% sulfuric acid and 2000 grams of alpha-pinene was agitated and maintained at a temperature of 55–60° C. for 8 hours. One thousand grams of water were then added and the resulting mixture was separated into an oily layer and a water layer. The oily layer was washed with 5% sodium hydroxide solution to remove residual acid. It was then fractionated at an absolute pressure of 25 mm. to form a fraction consisting chiefly of terpene hydrocarbons, a fraction consisting chiefly of terpene ethyl ethers (chiefly terpinyl ethers) and a fraction consisting chiefly of terpene ethylene glycol ethers (chiefly terpinyl). The ether fractions were substantially odorless.

It will be understood that the details and examples hereinbefore set forth are illustrative only and that the invention as broadly described and claimed is in no way limited thereby.

What I claim and desire to protect by Letters Patent is:

1. A method for preparing aliphatic polyhydric alcohol terpene ethers of reduced odor which comprises reacting a turpentine with ethlene glycol in a medium comprising a lower alkyl monohydric alcohol and an acid catalyst and recovering ethylene glycol terpene ethers produced by the reaction.

2. A method for preparing aliphatic polyhydric alcohol terpene ethers of reduced odor which comprises reacting alpha-pinene with ethylene glycol in a medium comprising a lower alkyl monohydric alcohol and an acid catalyst and recovering ethylene glycol terpene ethers produced by the reaction.

3. A method for preparing aliphatic polyhydric alcohol terpene ethers of reduced odor which comprises reacting beta-pinene with ethylene glycol in a medium comprising a lower alkyl monohydric alcohol and an acid catalyst and recovering ethylene glycol terpene ethers produced by the reaction.

4. A method for preparing terpene ethers of reduced odor which comprises treating a pinene with a mixture comprising ethylene glycol, a lower alkyl monohydric alcohol, and sulphuric acid at a temperature between about 30° C. and about 70° C. until the resulting etherification is substantially complete, and recovering a fraction consisting essentially of ethylene glycol terpene ethers and a fraction consisting essentially of lower alkyl monohydric alcohol terpene ethers from the reaction product mixture.

5. A method for preparing aliphatic polyhydric alcohol terpene ethers of reduced odor which comprises reacting a pinene with ethylene glycol in a medium comprising methyl alcohol and an acid catalyst at a temperature between about 30° C. and about 70° C., and recovering the resulting ethylene glycol ethers derived from the pinene from the reaction product mixture.

6. A method for preparing aliphatic polyhydric alcohol terpene ethers of reduced odor which comprises reacting a pinene with ethylene glycol in a medium comprising ethyl alcohol and an acid catalyst at a temperature between about 30° C. and about 70° C., and recovering the resulting ethylene glycol ethers derived from the pinene from the reaction product mixture.

7. A method for preparing aliphatic polyhydric alcohol terpene ethers of reduced odor which comprises reacting a pinene with ethylene glycol in a medium comprising isopropyl alcohol and an acid catalyst at a temperature between about 30° C. and about 70° C., and recovering the resulting ethlene glycol ethers derived from the pinene from the reaction product mixture.

8. A method for preparing an aliphatic polyhydric alcohol terpene ether of reduced odor which comprises reacting a pinene with a glycol selected from the group consisting of ethylene glycol, propylene glycol and trimethylene glycol, in a medium comprising a lower alkyl monohydric alcohol and an acid catalyst, and recovering a glycol terpene ether produced by the reaction.

9. A method for preparing an aliphatic polyhydric alcohol terpene ether of reduced odor which comprises reacting a turpentine with a glycol selected from the group consisting of ethylene glycol, propylene glycol and trimethylene glycol, in a medium comprising a lower alkyl monohydric alcohol and an acid catalyst, and recovering a glycol terpene ether produced by the reaction.

DONALD H. SHEFFIELD.

CERTIFICATE OF CORRECTION.

Patent No. 2,347,337. April 25, 1944.

DONALD H. SHEFFIELD.

It is hereby certified that error appears in the printed specification of the above numbered patent requiring correction as follows: Page 2, first column, line 42, for "carbonate" read --bicarbonate--; and that the said Letters Patent should be read with this correction therein that the same may conform to the record of the case in the Patent Office.

Signed and sealed this 6th day of June, A. D. 1944.

Leslie Frazer (Seal) Acting Commissioner of Patents.